United States Patent [19]
Hipwell

[11] 4,081,827
[45] Mar. 28, 1978

[54] APPARATUS FOR ENCODING TELEVISION SIGNALS

[75] Inventor: William E. H. Hipwell, Elstree, England

[73] Assignee: Eastman Kodak Company, Rochester, N.Y.

[21] Appl. No.: 726,903

[22] Filed: Sep. 27, 1976

[30] Foreign Application Priority Data

Oct. 1, 1975 United Kingdom ............... 40168/75

[51] Int. Cl.² .............................................. H04N 9/34
[52] U.S. Cl. ......................................... 358/14; 358/11
[58] Field of Search ..................... 358/4, 11, 14, 16, 12

[56] References Cited
U.S. PATENT DOCUMENTS

| | | | |
|---|---|---|---|
| 3,162,838 | 12/1964 | Sauvanet | 358/14 |
| 4,001,875 | 1/1977 | Le Parquier | 358/14 |

Primary Examiner—John C. Martin
Attorney, Agent, or Firm—Thomas H. Close

[57] ABSTRACT

A method and apparatus for modifying a color television signal permits three types of information to be coded onto a single subcarrier. Preferably two chrominance signals and a low frequency luminance signal are modulated onto the subcarrier in different sets of two such signals per scan line, such different sets being alternated on a line-by-line basis. The signals of such a set of two while occurring simultaneously are displaced in phase on the subcarrier and the subcarrier frequency is preferably selected to be an odd multiple of one-quarter of the line frequency. By so selecting the subcarrier frequency, a combination of the subcarrier signal with a luminance signal may be effected in a manner allowing for subsequent signal separation by comb filtering.

4 Claims, 12 Drawing Figures

ODD LINES

EVEN LINES

APPARATUS FOR ENCODING TELEVISION SIGNALS

BACKGROUND OF THE INVENTION

1. Field of the Invention

The present invention relates to a method, and apparatus for modifying a color television signal, to include additional signal information on a chrominance subcarrier.

2. Description Relative to the Prior Art

A fundamental property of conventional magnetic tape recording systems is that the amplitude of the signal obtained on playback is proportional to the rate of change of flux intercepted by a playback head. Such rate is in turn proportional to the speed of the tape relative to the head, and the frequency of the signal recorded on the tape. One result of this property is that the ratio of signal to noise deteriorates rapidly as the frequency falls, and such deterioration presents difficulties in video tape-recording, where the frequencies to be recorded typically cover the range of 20 Hz to 5 MHz, a ratio of $1:2.5 \times 10^5$.

A known solution to this problem is to modulate the video signal on a carrier frequency so as to reduce the ratio between the upper and the lower frequency extremes to be handled. For example, if amplitude modulation of a 6 MHZ carrier were employed, the range of frequencies in the lower sideband would be approximately 1 MHz to 6 MHz, a ratio of 1:6. If the upper sideband alone is considered, the ratio is 1:1.83 (6 MHZ to 11 MHZ). There are of course difficulties in handling the resultant higher frequencies, and so there are limitations. Further, the simple harmonic relationship between luminance components, and between luminance and chrominance components is destroyed by the modulation process, and non-linear distortion becomes more serious.

It is usual to frequency modulate the carrier, though this requires a wider bandwidth than amplitude modulation, and spurious signals may be caused by "folding" of the higher order lower-sidebands around the zero-frequency axis, giving rise to patterning noise and moire' effects. Nonetheless, the majority of existing designs are of this type.

SUMMARY OF THE INVENTION

A method and apparatus are provided for modifying a standard color television signal (NTSC, PAL or SECAM) to include three types of information on a single subcarrier. More specifically, two normal chrominance signals share a subcarrier with a third signal, preferably a low frequency component of the luminance signal. Such "triple sharing" is achieved by modulating the subcarrier by two of the three signals at a time, which groupings of two change repeatedly on a line-by-line basis. The two signals of a grouping are, according to the invention, phase displaced on the subcarrier in a manner similar to the two chrominance signals in the NTSC system but, as is discussed more fully below, the subcarrier frequency, unlike that for the NTSC system, is preferably chosen to be an odd multiple of one quarter of the line frequency.

In a preferred implementation, a low frequency luminance signal component is separated from a normal NTSC formatted signal and shares a subcarrier with the normal color signals (commonly denoted I and Q). The I and Q signals are alternately suppressed on a line-by-line basis and the unsuppressed I or Q signal is modulated onto a subcarrier with the low frequency luminance information component. Such two signals are modulated at a relative phase displacement as mentioned above to produce a "pseudo chrominance signal."

The subcarrier frequency may be chosen to be a frequency beyond the luminance signal frequency band so that, after combination in a composite signal, separation of the high frequency luminance information component from the subcarrier information can be effected as necessary by, for example, low pass filtering.

It is preferred, however, to cause at least a portion of the luminance signal frequency range to be shared for purposes of bandwidth economy. By selecting the subcarrier frequency to be a harmonic of the line frequency offset by a quarter of the line frequency (an odd multiple of one quarter of the line frequency) it results that the subcarrier energy bands can be caused to occur between the energy bands for the high frequency luminance signal component. A composite of the luminance and pseudochrominance signals can consequently be separated whenever necessary by comb filtering. Such comb filtering is achieved, for example, using a two-line-period delay. By comparing lines separated by one line (two line delay), the same grouping of information, say I and high frequency luminance, is represented on the subcarrier (because of the line-by-line alternation of two signal groupings), and as a result of the one-quarter of the line frequency offset in subcarrier frequency, the signal is inverted (an accumulated 180° shift).

While the above discussion has centered on the preferred use of the invention, i.e., to avoid use of low signal frequencies it will be appreciated that the third signal on the subcarrier may also be selected to be, for example, a stereo information signal or an infrared image signal.

The present invention will now be described, by way of example, with reference to the accompanying drawings in which.

The description that follows is generally with reference to a television signal having an NTSC format, but the principles, as described, are generally applicable to any television signal as herein described.

Considering now the method of the present invention, as applied to an NTSC television signal, the luminance and chrominance components of such NTSC color television signal are first separated or decoded by comb filtering. The luminance signal is then passed through a low-pass filter to obtain a low-frequency luminance signal $Y_{LF}$, and by means of a differential amplifier which compares the filtered $Y_{LF}$ with a suitably delayed unfiltered signal the complementary high-frequency luminance signal $Y_{HF}$ is obtained. The chrominance signal is modified by suppressing the I and Q components alternately line by line, and the filtered $Y_{LF}$ is modulated on a subcarrier in the phase of the suppressed component and added to the unsuppressed component to form a pseudo-chrominance signal which conveys $Y_{LF}$ and I, and $Y_{LF}$ and Q, information on alternate lines. This pseudo-chrominance signal is added to the separated $Y_{HF}$ signal to form a modified 'no-lows' television signal in which there are no frequencies below the cut-off frequency of the $Y_{HF}$ low-pass filter.

The modified signal may be restored to the standard format, for processing in a television receiver for example, by making use of a one-line chrominance delay line operating at the subcarrier frequency, which will make both I and Q signals available simultaneously. A low pass or a comb filter may separate the luminance $Y_{HF}$ from the "pseudo-chrominance" $Y_{LF}$ and I, $Y_{LF}$ and Q. A low pas filter may be used if the subcarrier frequency is selected to be sufficiently high so that pseudo chrominance signal does not overlap the frequency band for the $Y_{HF}$ luminance signal. For comb filtering the subcarrier frequency must be selected as an odd multiple of one quarter of the line frequency as is discussed more fully below. The "pseudo-chrominance" signal is fed along into two paths. Using the same technique as in the modifying operation described above, the $Y_{LF}$ is suppressed from the pseudo-chrominance signal in one path leaving pure I and Q on alternate lines. This sequential signal is passed through a one-line delay whose input and output are summed, giving I and Q simultaneously on all lines. In the other path a synchronous demodulator switched between the Q and I phases on alternate lines recovers the $Y_{LF}$ signal. All that is necessary to restore a standard NTSC signal is to add together (1) $Y_{LF}$ from the synchronous demodulator (2) $Y_{HF}$ from the low pass or comb filter and (3) I and Q from the one-line delay.

Figure 1:
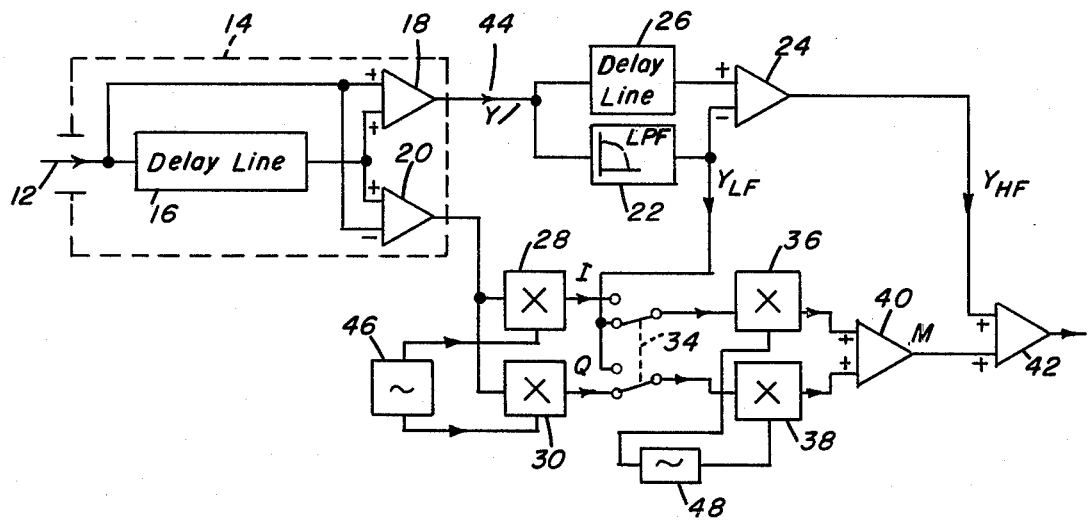
FIG. 1 is a block diagram of a basic form of an apparatus for modifying a television signal according to the present invention.

The apparatus of FIG. 1 shows a block diagram of a basic form of the apparatus 44 for modifying a television signal. An NTSC signal is applied to an input 12 of the apparatus 10. The input 12 is fed to a comb filter 14, of conventional type formed by a delay line 16, a sum amplifier 18, and a difference amplifier 20. The delay line 16 has a delay equivalent to one horizontal line of the television signal, and since the NTSC color subcarrier frequency is a multiple of half the line frequency the phase of the subcarrier is reversed on alternate lines. The input and output of the delay line 16 are fed to the inputs of the sum amplifier 18, when the chrominance component cancels, the output of the amplifier 18 being the luminance component Y, which is averaged over two lines.

The output of the amplifier 18 is fed through a low-pass filter 22 to one input of a differential amplifier 24, and through a delay-line 26 to the second input of the differential amplifier 24. The bandwidth of the low-pass filter 22 is typically 300 KHz, and the delay in the delay-line 26 is equal to the delay produced by the low-pass filter 22. The output from the differential amplifier 24 is the difference between the low-frequency luminance component $Y_{LF}$, and the wide-band luminance component Y, being the high-and medium-frequency luminance component $Y_{HF}$.

The difference amplifier 20 of the comb filter 14 has direct inputs of the NTSC signal and the NTSC signal delayed by the delay line 16, providing an output of the chrominance component, luminance changing only marginally from line to line.

The chrominance component is applied to two synchronous demodulators 28, 30 which are supplied with appropriate phases of a reference subcarrier from a reference oscillator 46, synchronized in a normal manner with the incoming color reference burst of the NTSC signal, by means not shown. Outputs of the I and Q components of the NTSC signal are then obtainable from the demodulators 28, 30 respectively.

A two-pole two-way electronic switch 34 is changed line by line, by means not shown, so that Q or $Y_{LF}$ are fed alternately to a modulator 36, and $Y_{LF}$ or I are fed alternately to a modulator 38. The modulators 36, 38 operated in the doubly-balanced mode, are fed with suitable phases of a reference subcarrier from a second reference oscillator 48. The outputs of the modulators 36, 38 are double-sideband suppressed-carrier signals in phase-quadrature, similar to the input NTSC chrominance signals, except that I and Q are replaced alternately line by line, by $Y_{LF}$.

The outputs of the modulators 36, 38 are summed by an amplifier 40, and the high- and medium-frequency luminance component $Y_{HF}$ and the output of the amplifier 40 are summed by amplifier 42, to provide an output from the amplifier 42 of a "modified 'no-lows' video signal."

Preferably, but not necessarily, the $Y_{LF}$ luminance component applied to the modulators 36, 38 is clamped, so that the carrier component corresponding to $Y_{LF}$ goes to zero at black level, reducing the visibility of the carrier on a display.

Because of the line-by-line switching of the I, Q and $Y_{LF}$ signals, the spectrum of the switched signal, that is, the output from the amplifier 42 in FIG. 1, contains components at half the line frequency and at harmonics thereof.

As indicated above, a problem arises if the chosen subcarrier frequency is an odd multiple of half the line frequency, as, for example, is the case for the standard NTSC broadcast signal. Some of the sidebands resulting from modulation of the I, Q and $Y_{LF}$ signals on the subcarrier will be superimposed exactly on the line-frequency harmonic components of the medium and high-frequency luminance signal $Y_{HF}$ and a decoding apparatus would be unable to separate the signals.

This situation may be avoided however by choosing a subcarrier frequency (i.e., the frequency of the oscillator 48) which is offset from a harmonic of the line-frequency by a quarter of the line frequency, rather than a half the line frequency as is normal in the NTSC system. The purpose of such a frequency offset is to cause the phase of the subcarrier to change by 90° between successive lines and by 180° after two lines. As a result of such phase change, signals one field line removed from one another may be added to give a luminance component without the subcarrier, while the subtraction of said input from said output would give the subcarrier without such luminance component.

Figure 4:
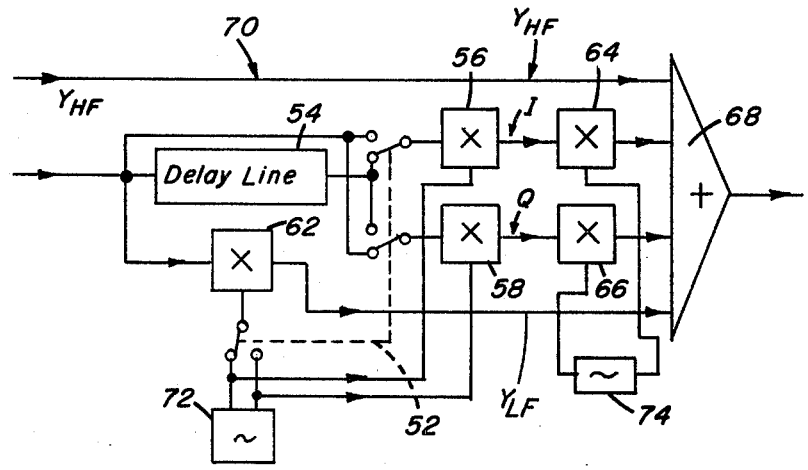
FIG. 4 shows a block diagram of an apparatus for recovering the original NTSC signal from a modified signal.

A signal having a standard NTSC form may be recovered from the modified signal by a reversal of the foregoing process. In FIG. 4, to which reference is now made, is shown a block diagram of an apparatus 50 for performing this reversal.

An input "modified 'no-lows' video signal" is separated into the medium-and high-frequency luminance component $Y_{HF}$ and the "pseudo-chrominance" components ($Q + jY_{LF}$ and $Y_{LF} + jI$ alternately), by means not shown in FIG. 1. Such means preferably includes a two line delay so that signals one line separated can be summed and differenced as discussed above.

The "pseudo chrominance" components are fed to two poles of a three-pole two-way electronic switch 52, to one pole by a direct connection and to the second pole through a delay line 54. The switch 52 is switched line by line, so that direct and delayed "pseudo chrominance" components are fed alternately line by line to two synchronous demodulators 56, 58, such that the "pseudo-chrominance" component $Y_{LF} + jI$ is always fed to the demodulator 56, and "pseudo-chrominance" component $Q + jY_{LF}$ is always fed to the demodulator 58. The modulators 56, 58 are fed with appropriate phases of a reference subcarrier from a reference oscillator 72, synchronized in a normal manner with the oscillator 48 of FIG. 1, by means not shown. I and Q are then obtainable at the outputs of the demodulators 56, 58, respectively.

The "pseudo-chrominance" components are also fed to a synchronous demodulator 62, which is also fed alternately, line by line, with the phases of the reference subcarrier from the oscillator 72 through the third pole of the switch 52, giving an output of the low-frequency luminance $Y_{LF}$ from the demodulator 62.

The chrominance signals I and Q are then each modulated on a reference NTSC subcarrier from an oscillator 74, by modulators 64, 66 respectively.

The chrominance signals I and Q modulated on the subcarrier and the medium-and high-frequency luminance component $Y_{HF}$ and the low-frequency luminance component $Y_{LF}$ are now summed in a summing amplifier 68 to form a standard NTSC signal at the output of the amplifier 68.

Figure 2A:
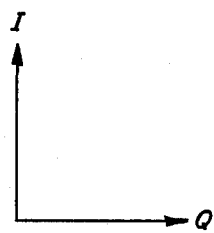
FIG. 2a shows the relationship between the input color difference signals.
Figure 2B:
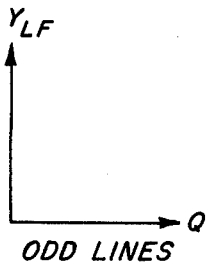
FIGS. 2b and 2c show the relationships between the output color difference signals, and the low-frequency luminance signal after modification of the television signal by the apparatus shown in FIG. 1.
Figure 2C:
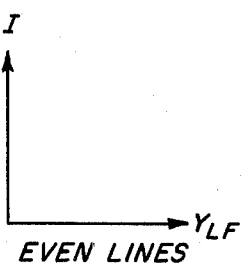

FIG. 2a shows by a phasor diagram the chrominance signals at the input of the apparatus of FIG. 1. FIG. 2(b) shows by phasor diagrams the relationship between the chrominance signals at the output of the apparatus of FIG. 1.

Figure 3A:
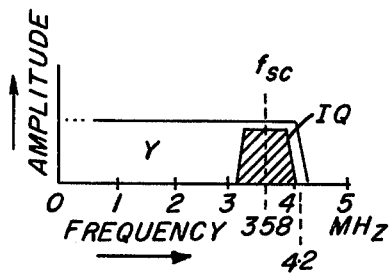
FIG. 3a shows the spectrum of a standard NTSC signal.
Figure 3B:
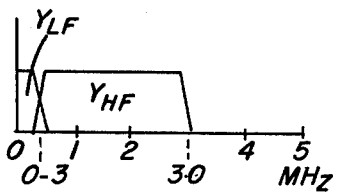
FIG. 3b shows the relationship between the low-frequency luminance signal and the high-frequency luminance signal.
Figure 3C:
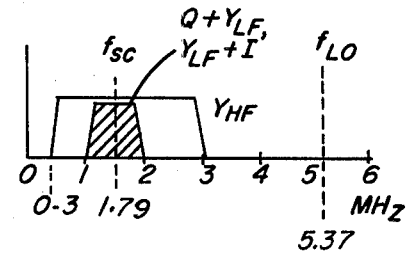
FIG. 3c shows the NTSC signal of FIG. 3a after modification in the apparatus of FIG. 1.

In FIG. 3(a) is shown a representation of the spectrum of a standard NTSC signal. FIG. 3(b) shows the relationship between the $Y_{LF}$ and $Y_{HF}$ signals, it being assumed that the upper-frequency end of the $Y_{HF}$ spectrum has been curtailed by filtering to about 3 MHz. In FIG. 3(c) is shown a spectrum for a signal recorded on tape, showing that there are no frequencies below 0.3 MHz or above 3 MHz, and assuming that the "pseudo-chrominance" signal has been heterodyned from 3.58 MHz down to 1.79 MHz using a local oscillator at 5.37 MHz. These frequencies are shown as representing typical frequencies that might be used in practice and are not meant to imply any loss of generality in the application of the technique described.

Where the input signal is of the PAL format, the necessary offset of a quarter of the line frequency is already present and the two oscillators shown both in FIG. 1 and FIG. 4, can be replaced in each case by a single oscillator if frequency translation of the subcarrier is not required.

Figure 5:
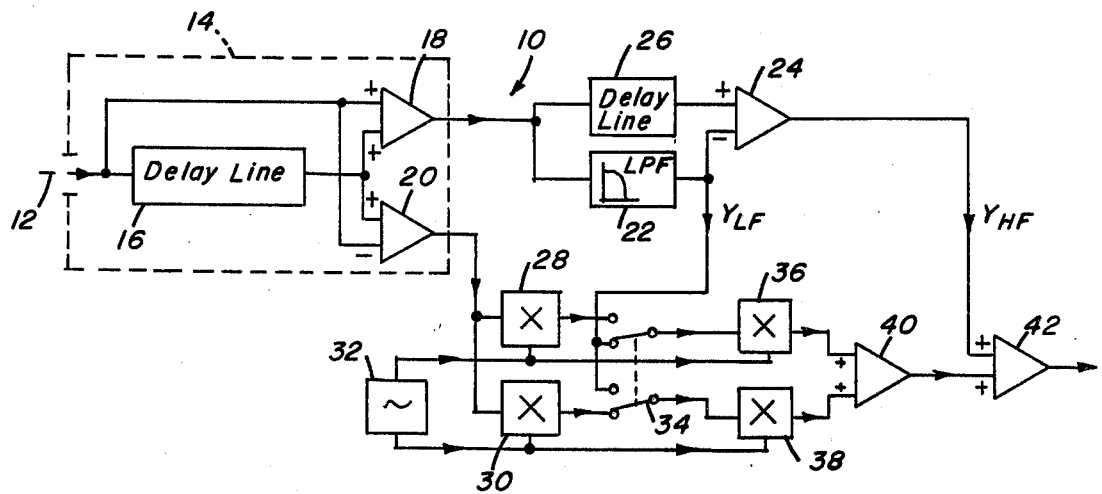
FIG. 5 shows a block diagram of a modified form of the apparatus shown in FIG. 1.
Figure 6:
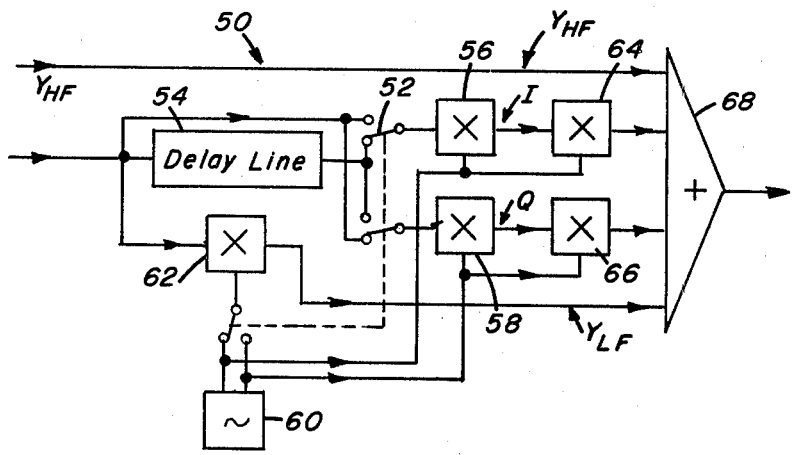
FIG. 6 shows a block diagram of a modified form of the apparatus shown in FIG. 4 for use in conjunction with the form of the apparatus of FIG. 1 shown in FIG. 5.

To implement such an arrangement a modified form of the apparatus of FIG. 1 and 4, as shown in FIGS. 5 and 6 respectively, is used. Items performing basically similar functions to the corresponding items in FIGS. 1 or 4, have the same identifying number.

In the apparatus 10 as shown in FIG. 5, the oscillators 46 and 48 of FIG. 1 are replaced by an oscillator 32. The oscillator 32 feeds the reference subcarrier to the synchronous demodulators 28, 30, as before, to provide outputs of the color difference components of the PAL signal, ($E_R' - E_y'$) and ($E_B' - E_y'$) respectively.

The electronic switch 34 then feeds ($E_R' - E_y'$) or $Y_{LF}$ and $Y_{LF}$ or ($E_B' - E_y'$) alternately to the respective modulators 36, 38 which are fed with the subcarrier from the oscillator 48.

In the apparatus 50 shown in FIG. 6, the ($E_R' - E_y'$) and ($E_B' - E_y'$) components are recovered by the demodulators 56, 58 which are fed from an oscillator 60 having a frequency synchronized with the color burst.

The PAL signal is then reconstituted by using the modulators 64, 66, fed from a reference PAL subcarrier oscillator 74, followed by the summing amplifier 68.

An undesirable feature of the apparatus shown in FIGS. 1 and 4, or FIGS. 5 and 6, is that in each case the color difference chrominance components are fed through both a modulator and a demodulator, or vice-versa, in tandem. The modulator 64 must be fed with a switched subcarrier to provide the correct phase relationship.

The chrominance component of an NTSC color television signal is the sum of two suppressed-carrier amplitude-modulated signals in quadrature, and may be represented by $$C = Q \sin qt + I \cos qt.$$

The conjugate signal, $$C = Q \sin qt - I \cos qt,$$

may be produced by multiplying the signal C by 2 cos 2 qt, which corresponds to the second harmonic of the color subcarrier, and may be obtained readily.

$$C = Q \sin qt + I \cos qt.$$

Multiplying both sides of this equation by 2 cos 2 qt:

$$(2 \cos 2\, qt) \cdot C = (Q \sin qt + I \cos qt) \cdot 2 \cos 2\, qt =$$
$$2 Q \sin qt \cdot \cos 2\, qt + 2\, ]I \cos qt \cdot \cos 2\, qt = 2 Q$$
$$\sin qt\, (1-2 \sin^2 qt) + 2\, I \cos qt\, (2 \cos^2 qt - 1).$$

Since $\cos 2\, qt = 1-2 \sin^2 qt = 2 \cos^2 qt - 1$, $(2 \cos 2\, qt) \cdot C = 2\, Q \sin qt - 4\, Q \sin^3 qt - 2\, I \cos qt + I \cos^3 qt$. But $\sin 3\, qt = \sin qt - 4 \sin^3 qt$, so $\sin^3 qt = \frac{3}{4} \sin qt - \frac{1}{4} \sin 3\, qt$.
And $\cos 3\, qt = 4 \cos^3 qt - 3 \cos qt$, so $\cos^3 qt = \frac{3}{4} \cos qt + \frac{1}{4} \cos 3\, qt$.
Substituting for $\sin^3 qt$ and $\cos^3 qt$, (2 cos 2 qt) · C = 2 Q sin qt − 4 Q (¾ sin qt − ¼ sin 3 qt) − 2 I cos qt + 4 I (¾ cos qt + ¼ cos 3 qt) = 2 Q sin qt − 3 Q sin qt + Q sin 3 qt − 2 I cos qt + 3 I cos qt + I cos 3 qt = −Q sin qt + I cos qt + Q sin 3 Qt + I cos 3 qt.

The first and second terms of this expression are the required conjugate signal C' (multiplied by − 1); the third and fourth terms represent the Q and I signals modulated on the third harmonic of the color subcarrier and can be removed easily by filtering.

Addition of C and C' then gives 2 Q sin qt and subtraction of C' from C gives 2 I cos qt. Thus the Q and I components are obtained, still modulated on the color subcarrier.

As an alternative to subtracting C' from C, C may be multiplied by − 2 cos 2 qt, to give C'' = − C'; 2 I cos qt will then be obtained by the addition of C and C''.

Apparatus making use of this principle will be described with reference to FIGS. 7 and 8, wherein elements performing the same functions as in FIGS. 1 or 4 will be identified by the same reference number.

Figure 7:
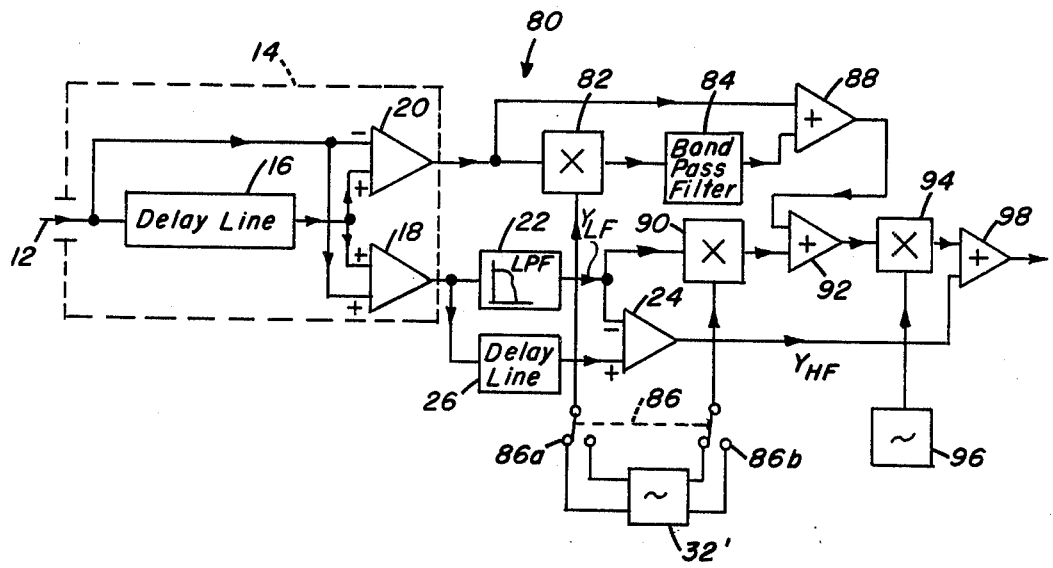
FIG. 7 shows an alternative embodiment of an apparatus for modifying a television signal according to the present invention.

In FIG. 7 an apparatus 80 has, as in FIG. 1 a comb filter 14 comprising a delay line 16, and sum and difference amplifiers 18, 20 respectively, to which an NTSC signal 12 is fed.

The output of the sum amplifier 18 is fed to the low-pass filter 22, in parallel with the delay line 26, the outputs of which are fed to the differential amplifier 24. The output of the differential amplifier 24, is the middle- and high-frequency luminance signal $Y_{HF}$, and the output of the low-pass filter 22 is the low-frequency luminance signal $Y_{LF}$.

The output of the difference amplifier 20 is the chrominance signal C, which is fed to one input of a mixer 82 the output of which is fed to a band-pass filter 84. A reference oscillator 32' provides outputs of the second harmonic of the color subcarrier, frequency $2F_{SC}$, the complement of the second harmonic of the color subcarrier, frequency $-2F_{SC}$, the color subcarrier frequency $F_{SC}$ and the color subcarrier frequency phase-advanced by 90°, $jF_{SC}$. The second harmonic of the color subcarrier frequency $2F_{SC}$ and its complement $-2F_{SC}$ are switched alternately to a second input of the mixer 82 by one set of contacts 86a of a switch 86, whose switching is synchronized with the line-frequency. The band-pass filter 84 has a pass-band centered on the color subcarrier frequency.

The output of the band-pass filter 84 is thus the conjugate signal C', and the complement of the conjugate signal C'', on alternate lines, the strong third harmonic component being removed by the band-pass filter 84.

The output of the band-pass filter 84 is fed to one input of a summing amplifier 88, a second input to the summing amplifier 88 being fed from the chrominance signal C being the output of the difference amplifier 20.

The output of the summing amplifier 88, is thus C + C', and C + C'' on alternate lines, that is 2 Q sin qt and 2 I cos qt, respectively.

The low frequency luminance signal $Y_{LF}$, from the low-pass filter 22, is fed to one input of a mixer 90.

A second input of the mixer 90 is fed with the color subcarrier frequency phase-advanced by 90° $jF_{SC}$, and the color subcarrier frequency $F_{SC}$, respectively by a second set of contacts 86b of the switch 86, the switching of contacts 86b being synchronized with the switching of contacts 86a. The output of the mixer 90 is then the low-frequency luminance signal $Y_{LF}$ modulated on the color subcarrier $F_{SC}$ in the phase of the suppressed component, that is 2 I cos qt or 2 Q sin qt, respectively.

The color subcarrier modulated with the low-frequency luminance signal and the output of the summing amplifier 88 are then summed by a summing amplifier 92.

The output of the summing amplifier 92, which comprises the sum of the color subcarrier $F_{SC}$ modulated with the color difference signals I and Q, suppressed alternately, line by line, and the low-frequency luminance signal $Y_{LF}$, modulated on the color subcarrier $F_{SC}$ in the phase of the suppressed signal, Q and I, respectively, is then translated to a lower carrier frequency by applying to one input of a modulator 94, a second input of which is fed with an appropriate carrier frequency from a local oscillator 96.

The translated signal and the medium- and high-frequency luminance signal $Y_{HF}$ are then summed by a summing amplifier 98, to provide an output, which is a 'no-lows' television signal with a low color subcarrier frequency. For example, the incoming color subcarrier has the NTSC frequency of 3.58 MHz approximately, and the local oscillator 96 may be set to 5.37 MHz to give at the output of the translating modulator 94 a signal of NTSC type but with a subcarrier at 5.37 − 3.58 = 1.79 MHz. In practice, in order to retain the precision frequency interleaving feature and enable full use to be made of comb filtering and similar techniques it may be desirable to obtain both reference and local oscillator signals from a single oscillator by frequency division or synthesis.

For successful application of the frequency translation operation it must take into account the other operations necessary in a video tape recording equipment, and it is included here for this reason. In particular, any such operation should be performed before the modulated subcarrier is added to the $Y_{HF}$ signal.

The NTSC subcarrier frequency is nominaly 3.579545 MHz, which is 455 × ½ times the horizontal scan frequency or 15734.26 Hz for color operation. The signal processing system herein described depends on the choice of a translated subcarrier frequency that is an odd multiple of one-quarter of the line scan frequency. This will be achieved if the new frequency is fractionally related to the old in such a manner that the numerator of the fraction is an odd number and the denominator is 910 or one of its even factors. Preferably also the new frequency should be approximately in mid-band (i.e., about 1.7 MHz) and the fraction relating the two frequencies should be as simple as possible to simplify the construction of the necessary electronic circuits.

The factors of 910 are 2 × 5 × 7 × 13, and hence the denominator of the fraction may be 2, 10, 14, 26, 70, 130, 182 or 910. Starting with the smallest numbers this gives possible fractions: −½ 1/10, 3/10, 7/10, 9/10, 1/14, 3/14, 5/14, 9/14 etc.

Most of these can be eliminated as being either too high or too low, but using ½ gives a new subcarrier frequency of 1.7897725 MHz, which is 455 × ¼ times the horizontal frequency. The local oscillator necessary to produce this from the NTSC subcarrier must therefore run at 3/2 subcarrier frequency or 5.3693175 MHz.

Some systems of velocity error compensation in video recorders require a continuous 'pilot' frequency to be added to the signal on recording so that on playback velocity errors can be detected as deviations from nominal frequency of the pilot. For low visibliity, such a pilot should preferably be interleaved with the luminance spectrum. In this application a frequency of 1/7 of subcarrier or 0.5113657 MHz is suggested.

Figure 8:
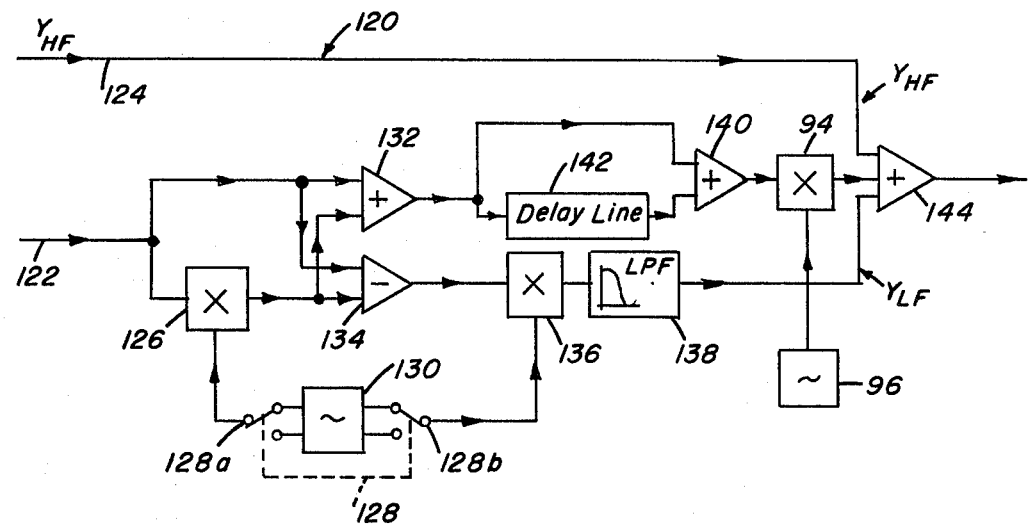
FIG. 8 shows a block diagram of an alternative embodiment of an apparatus for recovering the original NTSC signal.

A related technique to that of FIG. 7 may be employed for recovering the NTSC signal using an apparatus 120, as shown in FIG. 8. The comb-filtering and frequency translation steps are not shown in this figure, the input signals, to apparatus 120, being the pseudo-chrominance signal 122, and the medium- and high-frequency luminance signals 124.

The pseudo-chrominance signal 122 is applied to a modulator 126, where it is multiplied by the second harmonic of the color subcarrier frequency or the reversed phase second harmonic switched, alternately, line by line, by one set of contacts 128a, of a switch 128 from a reference oscillator 130, synchronized to the incoming subcarrier, by means not shown. Similarly to the procedure previously described, the output of the modulator 126 is the conjugate pseudo-chrominance signal, which is applied to one input of each of a sum amplifier 132 and a difference amplifier 134.

The second inputs of each of the sum amplifier 132 and the difference amplifier 134 are fed with the pseudo-chrominance signal 122.

The output of the sum amplifier 132 is thus the color difference signals Q and I, alternately, line by line, modulated on the color subcarrier frequency with the original 90° phase-relationship preserved.

The output of the difference amplifier 134 is the low-frequency luminance signal $Y_{LF}$, modulated alternately in I and Q phases on the color subcarrier frequency $\frac{1}{2} F_{SC}$.

The low-frequency luminance signal $Y_{LF}$ is recovered by feeding the output of the difference amplifier 134 to a synchronous demodulator 136, also supplied with the low color subcarrier frequency, switched between the two phases in quadrature $\frac{1}{2} F_{SC}$, j/2 $F_{SC}$ alternately, line by line, by a second set of contacts 128b of the switch 128, and supplied by the reference oscillator 130. The output of the demodulator 136 is fed to a low-pass filter 138 which removes residual color subcarrier frequency, and harmonics thereof, and passes the low-frequency luminance signal $Y_{LF}$.

The output of the sum amplifier 132, is fed to a further sum amplifier 140, both directly, and by way of a delay line 142. The delay line 142 produces a delay of one line and an inversion of 180° to compensate for the phase-reversal of the subcarrier in the NTSC system relative to the sync pulse on successive lines. The output of the further sum amplifier 140 thus contains both color difference signals I and Q, modulated on the low color subcarrier frequency, by means of mixer 94 and the oscillator 96. This low-color subcarrier frequency is heterodyned back to the normal NTSC subcarrier frequency.

Finally in FIG. 8 a summing amplifier 144 reconstitutes the NTSC signal from inputs of the medium- and high-frequency luminance signals 124 ($Y_{HF}$), I and Q modulated on the color subcarrier frequency from the mixer 94, and the low-frequency luminance signal $Y_{LF}$ from the low-pass filter 138. Not shown in the apparatus 120, but obviously necessary, are equalizing delays to match the timing of the signals at the inputs to the sum amplifier 144.

The operation of the equipment described obviously depends on the proper synchronization of the various line-by-line switches. While this presents no particular problem in the recording apparatus, provision must be made for proper synchronization on playback; the synchronization of the reference oscillator is a related problem, although a more conventional one. In this connection since the Q signal is deleted on alternate lines, the NTSC color burst, which is closer in phase to −Q than to I, will change both in amplitude and in phase from line to line. The amplitude will in fact change from cos 57° on the 'I' lines to − cos 33° on the 'Q' lines, or from 54% to 84%, relative to 100% for the incoming burst, and this could be used as an indication of the state of the switches at the time of recording. This also suggests that a possible variant would be to operate in B-Y and R-Y phases instead of Q and I, so that the burst would alternate between zero and one on alternate lines. The simplification is unlikely to compensate for the loss of every alternate reference burst unless an auxiliary 'pilot' signal, preferably a subharmonic of the color subcarrier, is used to provide a continuous reference. Such a pilot may be required in any event in connection with a velocity error compensation system. A suitable frequency for such a pilot would be 1/7 of color subcarrier frequency (0.511363571 MHz), and this could be accommodated just below the recorded video frequency band by raising the bandwidth of the $Y_{LF}$ signal to about 0.55 MHz. As this pilot frequency will interleave with the luminance spectrum however this may not be necessary.

An obvious variant of the basic scheme is to arrange that the $Y_{LF}$ signal is always in the same phase of the color subcarrier, so that I and Q (or R-Y and B-Y, or any other pair of quadrature components) always share the same phase. This will eliminate all switching from the playback electronics but will need additional 90° phase shifts in strategic places and in particular will cause some extra complexity in the elimination of one or other chrominance component in the recording equipment. Inverting the $Y_{LF}$ signal phase from line to line or in some cyclic manner will introduce some PAL-like error-correcting properties to the system.

Since the $Y_{LF}$ carrier frequency will always be present except during black parts of the picture, its presence or absence may be used in a dropout detecting system since this is otherwise difficult to arrange in direct recording. Since the $Y_{LF}$ component need never reverse its polarity, this would be facilitated by arranging to have always some residual $Y_{LF}$ carrier.

Although the NTSC and PAL systems have been considered above, the approach described may also be applied to for instance, a SECAM-encoded signal, which can be decoded to Y, R-Y and B-Y components; and recorded in an NTSC or PAL signal format. This of course will assume that suitable adjustments are made to filter and subcarrier frequencies as appropriate. In the case of PAL, some simplification may result as there is already a phase-switching sequence in the type of chrominance modulation adopted, and this enables the R-Y and B-Y components to be separated simply by means of a delay line, eliminating the need for the conjugate-forming step on recording.

The foregoing description refers to recording and replaying of color television signals, i.e., the signal includes color difference components and a color burst. It is obviously highly desirable that the apparatus described should be able to handle black-and-white television signals also.

This may be achieved by, for example, in the apparatus 10 of FIG. 1 or FIG. 5, disconnecting the outputs of the demodulators 28, 30. There is no color burst to synchronize the oscillators and it will be necessary to generate a suitable signal within the apparatus. Where recording is from a cheap industrial camera which has poor sync frequency stability, the signal generated by the apparatus may provide a high quality sync reference for the camera. If a high quality black-and-white signal is available, then the oscillator can be synchronized to the horizontal sync-pulses using a phase-locked loop.

The oscillator output can be used to provide a "monochrome burst", which can be used to synchronize the playback oscillators.

Where the elimination of low frequencies is not essential, such as for purposes other than recording the channel which has been described as being made available for use by the low-frequency luminance signal $Y_{LF}$ may be used to convey additional information. In surveillance for example a related infra-red image could be conveyed for display either superimposed on the normal picture, as a component of a false color picture, or separately; similar applications in medical thermography, or in industrial ultrasonic flaw detection, can be conceived. Alternatively the channel might be used for some form of stereoscopic difference signal, indicating depth or image displacement, since it would be very uneconomic to transmit stereoscopic television in color by duplication of the entire transmission system for what is essentially a very small difference in picture content.

The invention has been described in detail with particular reference to preferred embodiments thereof, but it will be understood that variations and modifications can be effected within the spirit and scope of the invention as described hereinabove. For example, as mentioned above, rather than code low frequency luminance on the chrominance subcarrier infrared or stereo image information might be recorded thereon.

What is claimed is:

1. A signal modifying apparatus that is adapted to receive a color video signal of the type providing scene information on line-by-line basis at a predetermined line frequency and having a luminance component and first and second chrominance components, said signal modifying apparatus comprising:

means for decoding such a video signal into a luminance signal representing the luminance component thereof and first and second ancillary signals representing respective chrominance components thereof;

means for supplying a third ancillary signal;

means for receiving said first, second and third ancillary signals and for suppressing, on an alternating basis line by line, one signal at a time from a set of at least two of said ancillary signals;

means for modulating the two unsuppressed ancillary signals for a line onto a subcarrier of preselected frequency to produce a subcarrier signal, such means including means for establishing a phase displacement between such two unsuppressed ancillary signals; and means for combining at least a portion of said luminance signal and said subcarrier signal into a composite signal.

2. A signal modifying apparatus according to claim 1 wherein said supplying means is a circuit connected to receive said luminance signal, which circuit includes low-pass filtering means for isolating a low frequency portion of said luminance signal as said third ancillary signal.

3. A signal modifying apparatus according to claim 2 wherein said first and second ancillary signals are alternately suppressed and said preselected subcarrier frequency is an odd multiple of one quarter of the line frequency.

4. A signal modifying apparatus according to claim 2 wherein said combining means includes complementary filtering means for removing said low frequency portion from said luminance signal to produce a complementary high frequency luminance signal and summing means for adding that high frequency luminance signal to said subcarrier signal to produce a composite signal.

* * * * *